March 6, 1973 T. W. VAIL 3,719,334

TAPE DRIVE CAPSTAN

Original Filed Nov. 21, 1968 2 Sheets-Sheet 1

INVENTOR

Thomas W. Vail

By Hofgren, Wegner, Allen, Stellman & McCord

ATTORNEYS

United States Patent Office 3,719,334

Patented Mar. 6, 1973

3,719,334

TAPE DRIVE CAPSTAN

Thomas W. Vail, Buffalo Grove, Ill., assignor to Warwick Electronics Inc.

Original application Nov. 21, 1968, Ser. No. 777,689, now Patent No. 3,677,555. Divided and this application Mar. 31, 1971, Ser. No. 129,763

Int. Cl. G03b *1/04;* G11b *15/32*

U.S. Cl. 242—181 6 Claims

ABSTRACT OF THE DISCLOSURE

A tape drive capstan having a long capstan shaft threadable through a plurality of tape cassettes wherein a shroud surrounds the capstan shaft and has a bearing rotatably supporting said capstan shaft near an exposed end thereof and said shroud engages a cassette in playing position thereof to resist deflection of the capstan shaft by force applied by the coacting pressure roller.

CROSS-REFERENCES TO RELATED APPLICATIONS

This application is a division of application Ser. No. 777,689, filed Nov. 21, 1968, now Pat. No. 3,677,555 and the disclosure thereof is incorporated herein by reference.

BACKGROUND OF THE INVENTION

This invention relates to a tape drive capstan particularly for a cassette changer wherein a series of cassettes can automatically be indexed for successive playing or recording of tape.

A tape cassette has a pair of tape reels with a reel-to-reel tape mounted therein. Previously, some devices of this type have been called tape cartridges.

Tape cartridge or cassette changers are known wherein each cartridge is moved from a reserve stack to playing position and then moved to a succeeding position, which requires complex handling mechanism for the cartridges and which creates increased reliability problems. Also known is a cartridge changer, as shown in Tatter et al. Patent No. 3,317,212, owned by the assignee of this application, in which cartridges are held in a holder and moved successively into playing position.

This invention pertains to an improvement in the changer of the type disclosed in the Tatter et al. patent to provide an improved drive for the tape and resultingly better sound in tape play and record operations.

SUMMARY

An object of this invention is to provide a new and improved tape drive capstan in a cassette changer which resists deflection under force applied by a coacting pressure roller.

Another object of the invention is to provide a tape drive capstan for the purpose set forth in the preceding paragraph wherein the capstan shaft is rotatably mounted in a tubular shroud of a size to thread into a cassette opening, a pair of bearings mount said capstan and with one bearing in the shroud adjacent a free end of the shaft exposed outside the shroud, and said shroud engages a cassette in playing position thereof to resist deflection of the capstan shaft under force applied by the coacting pressure roller.

DESCRIPTION OF THE PREFERRED EMBODIMENT

General organization

The cassette changer is fully disclosed in the aforementioned parent patent application and reference may be made thereto for a complete description. The disclosure of said application is incorporated herein by reference.

Figure 1:
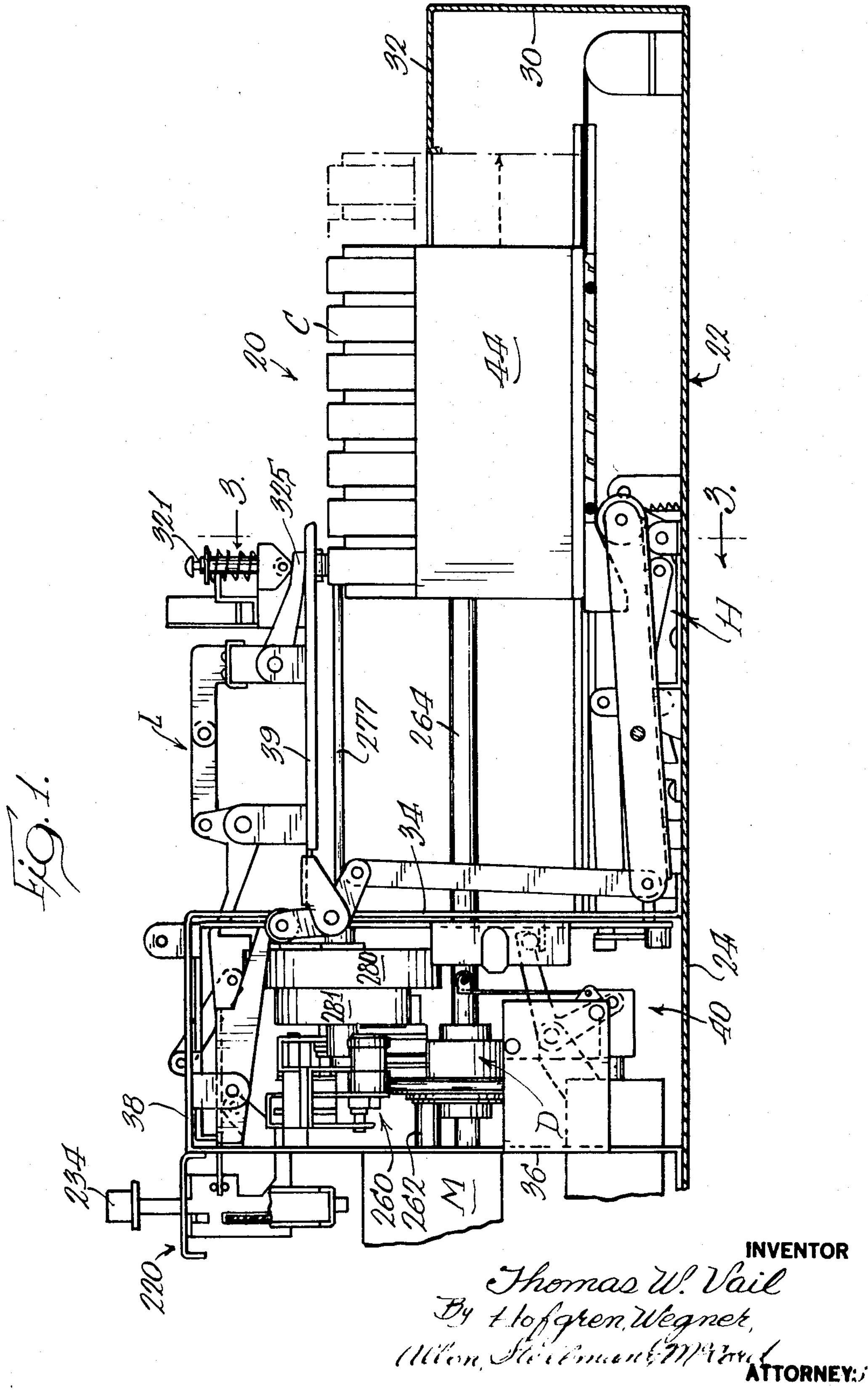
FIG. 1 is a front elevation of the cassette changer with a front panel removed and with parts at one end thereof broken away.

Referring now to the drawings, the cassette changer is designated in its entirety at 20 in FIG. 1, and the cassette holding and moving structure and the tape function controlling means are mounted upon a suitable chassis structure 22. The chassis 22 includes a generally rectangular base 24 having an upright front wall 26, the upper end 28 of which is turned and extends inwardly. Chassis 22 further includes an upright end wall 30 (FIG. 1) having a perpendicularly disposed inwardly turned upper end 32 positioned in the plane of upper end 28. The left-hand end of chassis 22 includes a pair of spaced, vertical walls 34 and 36, with a horizontally disposed top wall 38 extending therebetween to form an enclosed compartment for drive means.

A pair of inwardly facing vertically disposed tracks, one being shown at 42 (FIG. 3) are provided in a common horizontal plane to define a horizontal guide means for a cassette holder, indicated generally at 44. The cassette holder 44 is an upwardly open box-like member having a horizontally disposed base 46 and upright sides, one being shown at 48. An extension 50 extends laterally outwardly from the lower end of the side wall 48. A series of longitudinally spaced upright divider members 52 extend between side walls 48 to define cassette receiving slots therebetween for holding cassette C, with one being shown in FIG. 3. A plurality of holder supporting members 54 are welded, or otherwise suitably secured, to each of extensions 50, and the supporting members 54 extend laterally outwardly of the extensions 50 (FIG. 3) into the guide tracks 42, where they are supported by ball bearing assemblies retained in suitable cage structures.

Chassis structure 22 includes a horizontally disposed wall 39 that extends forwardly from upright wall 34 and capstan and transducing means are provided adjacent the outermost end of wall 39 to define a tape path into which each of the cassettes C may move. The cassette holder 44 is sequentially moved to position each of the cassettes C in the tape path.

Cassette index means

The cassette holder indexing structure includes mechanism indicated generally at H including structure to positively position the tape in a cassette C in the tape path for playing.

Tape controlling and transducing structure

A function selecting and controlling assembly 220 is mounted at the left-hand end of chassis 22, and includes a plurality of vertically movable actuable elements in the form of push buttons including push buttons 230, 232, and 234.

Drive means 260 is mounted in compartment 40 and includes a motor M.

The output shaft of motor M is identified at 262 and through a belt and pulley drive, indicated generally at D, drives one or the other of a pair of spindles with one shown at 264. The spindles each have a pawl 265 to engage a rotatable reel in the cassette.

Figure 2:
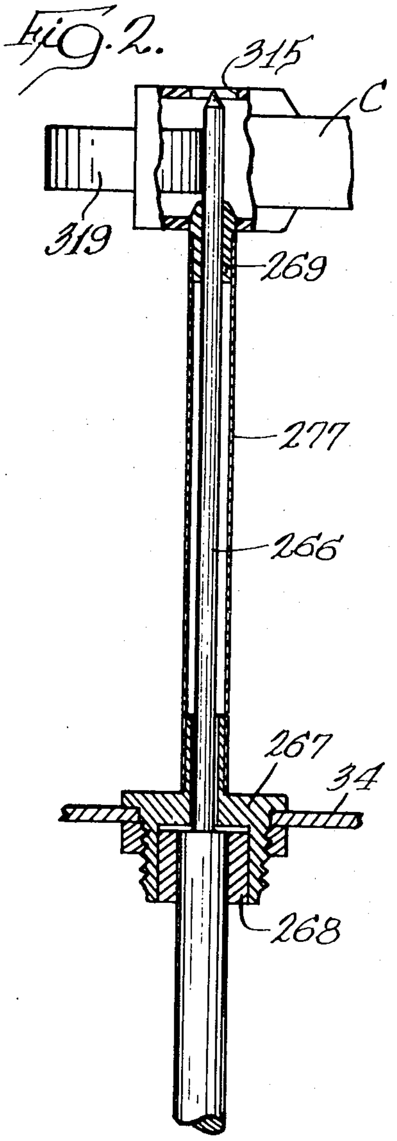
FIG. 2 is a fragmentary longitudinal section, on an enlarged scale, showing the mounting of the capstan shaft and the association thereof with a cassette.

The mounting for capstan shaft 266 is shown particularly in FIG. 2 wherein a bushing 267 is mounted in the wall 34 and has a tube 277 extended therefrom for a substantial part of the capstan shaft length. A pair of bearings 268 and 269 are supported in the bushing 267 and end of tube 277, respectively, to rotatably mount the capstan shaft with only a short free length of the capstan shaft exposed at the end thereof. This structure provides the necessary support for the long shaft capstan when force is exerted thereon by the pressure roller 319. The tube 277 provdes a shroud and has its outer diameter dimensioned to provide a running fit with a capstan receiving hole in the cassette. When the pressure roller 319 applies force to the capstan, the tube free end engages and is supported by the cassette with the total movement of the tube being only that provided by clearance between the tube and cassette opening. This provides a firm fixed support for the short exposed end of capstan shaft 266 and minimizes deflection.

A flywheel 280, at an end of the capstan shaft, with a reduced diameter portion 281 is driven by the drive 260.

Tape transducing structure

Figure 3:
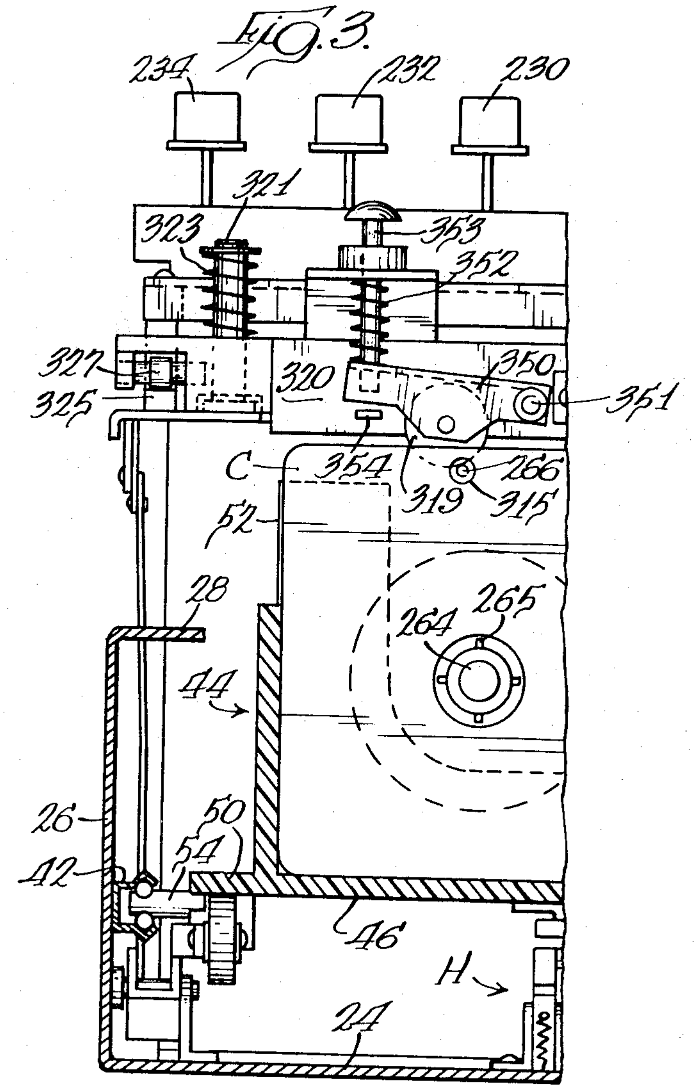
FIG. 3 is a vertical transverse section on an enlarged scale taken generally along the line 3—3 in FIG. 1.

The structure for either recording or playback of a tape is shown particularly in FIGS. 1 and 3 and includes the capstan 266, previously referred to, which can extend through an opening 315 in the cassette, the necessary magnetic heads, and the pressure roller 319. The heads and pressure roller are mounted for up and down movement on a bridge 320 which is movable up and down on a pair of posts, one being shown at 321, extending upwardly from the frame of the cassette changer. A spring 323 on the post engages the upper side of the bridge and urges it downwardly. The bridge 320 can be elevated against the force of springs 323 by rocking of a pair of lift arms, one being shown at 325, engaging under rollers on the bridge, one being shown at 327.

The lift arms are actuated by a linkage, indicated at L.

Referring to FIG. 3, the pressure roller 319 is carried on a pivot arm 350 pivoted to the bridge at 351 and yieldably urged in a direction to move toward the capstan 266 by a spring 352 guided on a pin 353 carried on the bridge with a stop 354 limiting downward movement of the pressure roller.

The elements shown in FIG. 3 including the capstan 266 and pressure roll 319, as well as the magnetic heads, together define a tape path in which the tape of a particular cassette C must lie for proper operation.

I claim:

1. A cassette changer for playing any one of a plurality of tape cassettes comprising, a capstan and a pressure roller defining a tape path, means mounting said pressure roller for movement toward and away from the tape path, a movable cassette holder for holding a plurality of cassettes, means for indexing said holder to present successive cassettes to a position wherein a length of tape lies in said path, at least one spindle positioned to extend through the reels of a plurality of cassettes, and a mounting for said capstan including a tubular member housing said capstan with the drive end of the capstan exposed, a bearing for the capstan at an end of the tubular member, and said tubular member having an outer diameter to pass through a cassette opening and said end of the tubular member positioned to engage a portion of the cassette at said position whereby the drive end of the capstan is closely supported.

2. A mounting for a tape drive capstan in a tape cassette changer having a substantial length and with the tape cassette having an access opening in a wall thereof for insertion of the capstan behind the tape comprising, an elongate capstan shaft, a pair of spaced-apart bearings rotatably mounting said shaft with a free end of said shaft positioned beyond one of said bearings to lie along a tape path, and means mounting said bearings with the mounting means for said one bearing positioned in said access opening of a tape cassette in playing position for engagement with the wall of the tape cassette to substantially prevent movement of said one bearing and deflection of said capstan shaft.

3. A mounting as defined in claim 2 wherein said mounting means comprises a tube having a running fit with the access opening of said cassette.

4. A mounting as defined in claim 2 with the free end of said shaft positioned to coact with a pressure roller urged toward said free end.

5. A tape drive capstan comprising, a capstan shaft extending outwardly a substantial distance from a supporting base to extend through an access opening of each of a plurality of tape cassettes with an end section engaging a tape in one tape cassette at a playing position, and means including a tube surrounding said capstan shaft and rotatably supporting said capstan shaft adjacent said end section and engageable with a portion of said one tape cassette whereby said engagement resists any deflection of said capstan shaft by force exerted by a coacting pressure roller which urges the tape against said end section.

6. A capstan as defined in claim 5 wherein said tube is of a size to have a running fit with an access opening in a tape cassette whereby a force tending to deflect said tube is resisted by the tube engagement with said tape cassette.

References Cited

UNITED STATES PATENTS

| | | | |
|---|---|---|---|
| 2,560,234 | 7/1951 | Masterson | 179—100.2 E |
| 2,590,665 | 3/1952 | Williams | 226—48 |
| 2,676,212 | 4/1954 | Williams | 179—100.2 R |
| 3,252,668 | 5/1966 | Miller et al. | 242—194 X |
| 2,867,435 | 1/1959 | Gleason | 242—55.19 A |

LEONARD D. CHRISTIAN, Primary Examiner

U.S. Cl. X.R.

226—190; 274—11 C